Patented Jan. 10, 1933

1,894,096

UNITED STATES PATENT OFFICE

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

SOAP PRODUCT AND METHOD OF MAKING SAME

No Drawing. Original application filed February 3, 1922, Serial No. 533,986. Divided and this application filed May 7, 1929. Serial No. 361,251.

This case forms a divisional part of my application Serial No. 533,986, filed February 3, 1922, for composition of matter and method of making the same now Patent No. 1,716,272 of June 4, 1920. A part of that specification is as follows:

In certain copending applications including Serial No. 272,567, filed January 22, 1919, and Serial No. 435,355, filed January 6, 1921, I have described processes for the partial combustion of aliphatic hydrocarbons in the presence of catalysts by which valuable partial combustion products are obtained. In carrying out the said process, I pass a heated mixture of mineral oil vapor and air in the proper proportions through a catalytic material, such as the blue oxides of molybdenum, while maintaining the reaction zone at a temperature of from about 230° C. to about 500° C., steam being added or not as desired. The temperature will vary with the distillate used and also in accordance with the other factors, such as the air ratio, kind of catalyst used, etc. The material thus treated is then condensed and the material condensed contains products in the range from alcohol to aldehyde fatty acids, including alhehydes and probably anhydrides and aldehyde alcohols.

In my application Serial No. 435,355, above referred to, I also disclose the applying of said partial oxidation process to the "cracked" products of petroleum fractions, especially in the producing of motor spirit or flotation oil. As disclosed in said application, the cracking may be carried out at atmospheric pressures or under higher pressures and temperatures, either in the liquid or vapor phase, and with or without a catalyst.

I have found that the product of said process is or may be formed into a desirable fuel for internal combustion engines, and I will now describe my preferred method of treating the same, it being understood that I am not limited to this example in my broader claims.

I distil the condensed product of said process preferably up to about 300°, the residue in the still consisting of the heavier compounds. This residue is a lubricant and may also be treated to form lubricants. It may also be made into soaps and other products of industrial value. The distilled product having an end point of preferably about 300° is then agitated with a volatile fuel, such as alcohol or benzol. The volatile or atomizable fuel which is added is preferably of such a nature as to dissolve at least a portion of the distilled portion of the original product, and I preferably add as much of said product as will pass into solution in the said volatile fuel. If alcohol is used for this purpose, two layers will usually be formed. One layer consists of the dissolved product, which may be drawn off, and is then ready for use as a liquid fuel for combustion engines. The other layer, which consists mainly of hydrocarbons, may then be taken and passed through the original partial combustion process to convert it into the partially oxidized product which may then be again treated as above.

In forming this improved fuel, I preferably remove the aldehyde fatty acids present after distillation, as for example, by converting them into soaps and removing the soap so formed. This, however, is not a necessary step and may or may not be carried out as desired. If employed, it is, of course, used prior to mixing with the volatile fuel.

Instead of using alcohol, such as denatured alcohol, to dissolve my product or a distilled portion thereof, I may employ another solvent, such as benzol, for this purpose. In this case, I agitate the mixture of benzol and said product to make a substantially complete solution The following experiments will serve to show the blending ranges possible in dissolving the above oxidized kerosene in various volatile fuels. (The percentages are all by volume.)

(1) Benzol dissolves "oxidized kerosene" in all proportions.

(2) Gasoline dissolves "oxidized kerosene" in all proportions.

(3) A mixture of 50% gasoline and 50% benzol dissolves "oxidized kerosene" in all proportions.

(4) Taking the 50% gasoline and 50% benzol mixture, it was found that the "oxidized kerosene" would make perfect solutions up to two parts of the kerosene to one of the 50:50 mixture, making the composition of the final solution:

| | Per cent |
|---|---|
| "Oxidized kerosene" | 66⅔ |
| Benzol | 16⅔ |
| Denatured alcohol | 16⅔ |

(5) Taking a mixture consisting of two parts of denatured alcohol and one part of benzol, it was found that solution of the "oxidized kerosene" took place perfectly up to three parts, making the composition of the final solution:

| | Per cent |
|---|---|
| "Oxidized kerosene" | 50 |
| Denatured alcohol | 33⅓ |
| Benzol | 16 |

This divisional part of said application relates to claims on fractioning the condensed product, as for example, by distilling and treating the fraction thus produced, by saponification or other treatment, to convert at least a portion of said fraction into another chemical compound or compounds.

In fractioning of said condensed material, as by distilling the different bodies contained in the condensed mixture are not separated from each other as to classes, but each fraction contains a number of different classes, such as alcohols, aldehydes, anhydrides, etc., those in one fraction differing from those of another fraction in the average molecular weight of said fraction. Some of the fractions will contain more of the oxygenated organic acids than others, but, in general, the composition of the different fractions will not differ from each other materially as to the main classes of substances contained, the different fractions differing in the molecular weights of the bodies contained, and hence in the average molecular weight thereof. By the term "hydrocarbons" in the claims, I intend to include either hydrocarbons containing only hydrogen and carbon, or oxygen derivatives including hydrogen, carbon and oxygen.

I claim:

1. As a new article of manufacture, a soap formed by saponification of a fraction of a liquid product of the partial oxidation of hydrocarbons.

2. In the treatment of a liquid partial oxidation product of hydrocarbons, the steps consisting of fractioning the same into fractions of different average molecular weight, and reacting upon a heavier fraction with a saponifying reagent.

3. As a new article of manufacture, a product formed by saponification of a fraction of a liquid product of the partial oxidation of hydrocarbons.

In testimony whereof I have hereunto set my hand.

JOSEPH HIDY JAMES.